(12) United States Patent
Wang et al.

(10) Patent No.: US 6,230,024 B1
(45) Date of Patent: May 8, 2001

(54) VOICE TO DIGITAL FAX TRANSMISSION

(75) Inventors: Chung-Ching Wang; Serge Manning; Jerry Louis Mizell, all of Plano, TX (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/078,142

(22) Filed: May 12, 1998

(51) Int. Cl.$^7$ ....................................................... H04Q 7/20
(52) U.S. Cl. ............................ 455/557; 455/426; 455/550
(58) Field of Search .................................... 455/426, 414, 455/418, 420, 550, 557, 561; 379/100.15, 100.16; 358/434–436, 442

(56) References Cited

U.S. PATENT DOCUMENTS

| | | | |
|---|---|---|---|
| 5,263,078 | * | 11/1993 | Takahashi et al. .................... 455/557 |
| 5,450,472 | * | 9/1995 | Brax ...................................... 455/557 |
| 5,481,598 | * | 1/1996 | Bergler et al. .................... 379/100.15 |
| 5,493,609 | * | 2/1996 | Winseck, Jr. et al. ............. 379/93.08 |
| 5,590,406 | * | 12/1996 | Bayley et al. .............. 379/100.16 X |
| 5,726,764 | * | 3/1998 | Averbuch et al. .................... 358/403 |
| 5,815,809 | * | 9/1998 | Ward et al. ........................... 455/428 |
| 5,818,871 | * | 10/1998 | Blakeney, II et al ................ 375/220 |
| 5,940,770 | * | 8/1999 | Kuki ...................................... 455/510 |
| 5,956,651 | * | 9/1999 | Willkie et al. ........................ 455/553 |
| 5,963,860 | * | 10/1999 | Muths et al. .......................... 455/412 |
| 5,966,430 | * | 10/1999 | Yoshida ........................... 379/100.15 |
| 6,011,968 | * | 1/2000 | Patel et al. ............................ 455/414 |

* cited by examiner

*Primary Examiner*—Nay Maung
(74) *Attorney, Agent, or Firm*—James A. Harrison; John D. Crane (57) ABSTRACT

A wireless communication network includes a mobile station and a base station which are adapted to allow an ongoing voice call to be converted to a digital fax call without forcing the user to relinquish the line and to reestablish a call for the purposes of a transmitting digital fax (fax from a digital device). A base station controller is adapted to respond to an analog tone which prompts the base station to set up a digital fax call even though a voice call is already in place. Similarly, a mobile station is adapted to set up a digital fax call even though a voice call is in place either when it receives the analog tone originated by the PSTN or when it receives an AT command from a personal computer indicating that a digital fax transmission is desired.

3 Claims, 6 Drawing Sheets

VOICE TO DIGITAL FAX TRANSMISSION

BACKGROUND OF THE INVENTION

1. Field of the Invention

The present invention relates to wireless communications and more particularly to transmitting digital faxes over a wireless communication link.

2. Description of Related Art

Under current wireless communication systems, a person wishing to transmit a facsimile often originates a call to the recipient just prior to transmitting the fax. Thereafter, the person must release (terminate) the voice call and must redial the same number as the voice call through the digital fax device (eg., personal computer with a digital fax board or a digital fax machine) to set up a line to transmit the facsimile from a system capable of transmitting information in a digital form. The method in the current art is inefficient in terms of resources and user time. Additionally, if a wireless communication medium is being used, then the user may pay for line charges which are not actually used as a result of these inefficiencies. More particularly, because of billing procedures which typically round up all charges to next minute, any user which needs to talk to a recipient prior to sending a fax will always pay for an additional amount of rounding in billing procedures because of the fact that two calls had to be placed to deliver one fax. Additionally, the mere time involved from such inefficiency causes users to be less efficient with our time and therefore increase the cost of labor unnecessarily. While any one such event may not cost a significant amount in terms of inefficiencies, the accumulative totals for such inefficiencies are noteworthy. Accordingly, there is a need for a system and method which allows a user to transmit a digital fax over a line which was initially established for a voice call.

SUMMARY OF THE INVENTION

The foregoing limitations of the current art is solved by creating a mobile station and a base station which allow an ongoing voice call to be converted to a digital fax call. Accordingly, a user can convert a call to a digital fax call without having to hang up, release a voice line (trunk), and redial to establish a digital fax line. Wireless telephone resources and labor efficiencies are improved, therefore. To achieve this desireable result, the base station is adapted to include logic which allows it to listen and be responsive to the receipt of a facsimile indicator signal, such as a calling fax tone signal, from a public switched telephone network (PSTN). As is known to a skilled in the ART, this calling fax tone signal indicates that a device in a PSTN seeks to originate a fax call. Accordingly, even though a voice call is in place, the base station takes steps to generate and transmit signals to set up a digital fax call between it and a digital fax device.

In effect, the described sequences cause the voice call to be converted to a digital fax call. The invention also includes a mobile station whose logic circuitry is adapted to cause it to initiate a digital fax call even though a voice call is in place upon the occurrence of one of two events. The first event is the receipt of a PSTN generated fax tone. One known signal of this type is a "Calling tone" (CNG). If, by way of example, a calling tone was passed through to the mobile station by the base station and if the base station has not yet initiated any signals to convert a voice call to a digital fax call, the mobile station initiates the necessary signals. Stated simply, the mobile station converts a call from the PSTN to a digital fax call if the base station has not yet initiated the transition to a digital fax call even though it passed the Calling tone through to the mobile station. In general, the Ring Indicator or RING result code signal is sent by the mobile station to ask a digital fax device to start the fax answering procedures.

The mobile station also initiates the signals to convert a voice call to a digital fax call when it receives a specified command from a personal computer or other digital fax device that is connected to the mobile station by a line such as a serial digital line. The specified command indicates that the digital fax device is attempting to transmit a digital fax. For example, the mobile station may receive an ATD command (without a dial string) or an AT+CSO=n, where n is the service option for digital fax command. Either of these commands may be used by the digital fax device to request that the mobile station initiate service negotiation to fax.

As may be seen, the invention not only includes the hardware modifications within the base stations and the mobile stations whose logic circuitry is adapted to accommodate this capability, but also includes specific methods for accomplishing the same. In general, new signal sequences are created to achieve a desired result. Additionally, the relative arrangement for sequences of known signals is modified to achieve the desired result. In general, the methods include setting up a digital fax call over a given communication path even though a voice call is already established on that communication path. The call may be set up a result of either a base station or a mobile station receiving a CNG tone(an analog tone) specifying that a device coupled to the PSTN desires to transmit a facsimile. Additionally, the inventive methods include the transmission of an ATD Dial command without a dial string or an AT+CSO=n command. Accordingly, the use of a Dial AT command without a dial string or AT+CSO=n command also is used to indicate to a receiving device that an ongoing voice call is to be converted to a digital fax call. As may be seen, therefore, the introduction of some of these new signals as well as the rearrangment of the sequence of known signals allows a wireless communication network to convert a voice call to a digital fax call without relinquishing a given communication link. As such, network efficiencies are increased and operational cost as well as labor cost are decreased.

BRIEF DESCRIPTION OF THE DRAWINGS

An understanding of the invention can be gained from the consideration of the following detailed description of the preferred embodiments in conjunction with the appended figures and drawings, wherein.

DETAILED DESCRIPTION OF THE INVENTION

Figure 1:
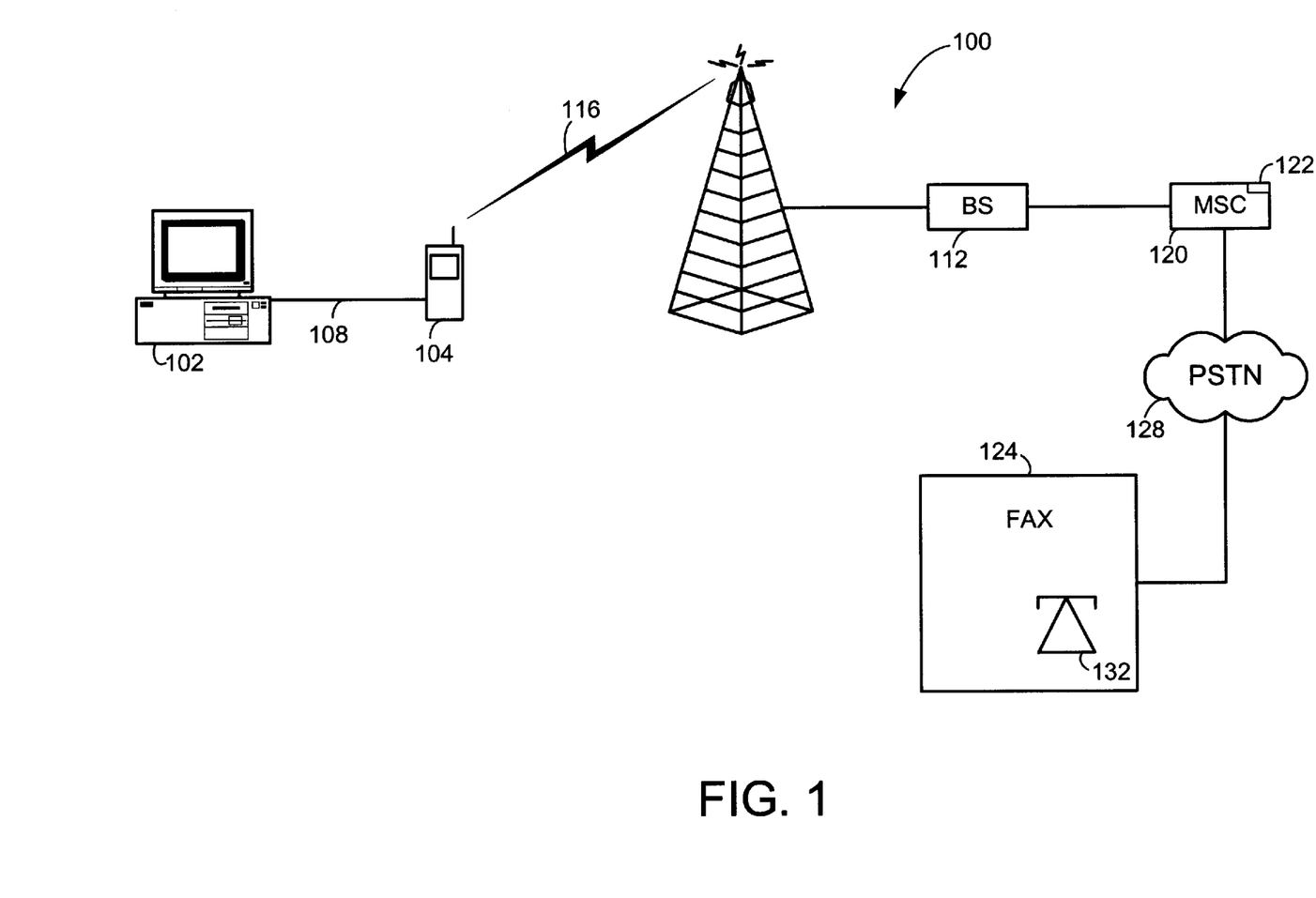
FIG. 1 is a functional block diagram of a communication network according to one aspect of the invention herein.

FIG. 1 is a functional block diagram of a communication network according to one aspect of the invention herein. Referring now to FIG. 1, a communication network 100 includes a personal computer 102 which is connected to a mobile station 104 by a serial digital line 108. While the system of FIG. 1 includes a personal computer 102, it is understood that personal computer 102 may easily be replaced by a fax capable digital terminal. Serial digital line 108 is for tranceiving serial digital communication signals in both directions. Accordingly, if personal computer (PC) 102 generates fax data communication signals are transmitted to mobile station 104 over line 108 containing control and/or data information. Mobile station 104 communicates with base station 112 over communication link 116. In a system of network 100, communication link 116 is a wireless air interface medium. Base station (BS) 112, in turn, communicates with mobile switching center MSC 120 for tranceiving communication signals therewith. MSC 120 includes circuitry 122 for converting between analog and digital fax signals as necessary.

MSC 120 also is coupled to fax machine 124 through the public switch telephone network 128. Accordingly, fax machine 124 may originate or receive facsimiles through the network 100 to/from PC 102. Further, fax 124 includes a telephone 132 which may be for voice calls prior to the initiation of a fax session. The mobile station 104 and base station controller 112 of network 100 include circuitry which allows a user of fax 124 or of mobile station 104 and PC 102 to originate a voice call and then to transmit or receive a digital fax without having to relinquish the line and without having to initiate a fax call with a new line.

In operation, in one embodiment of the invention, a user of fax machine 124 may originate a call from 132 to a called party located at mobile station 104. During the voice call which is routed through PSTN 128, MSC 120, BSC 112, air link 116 to MS 104. Once the communication link is established, the user may depress a select button to originate a fax sequence. Upon the depression of the select button, fax 124 creates a signal sequence which causes BSC 112 to communicate with mobile station 104 to convert the communication link to one which is appropriate for the incoming facsimile from fax machine 124. Thereafter, once the wireless network has been set up for a digital fax, the fax data is transmitted from fax machine 124 to mobile station 104 and then to PC 102 over serial digital line 108. It is understood that this process may also work in reverse order.

Figure 2:
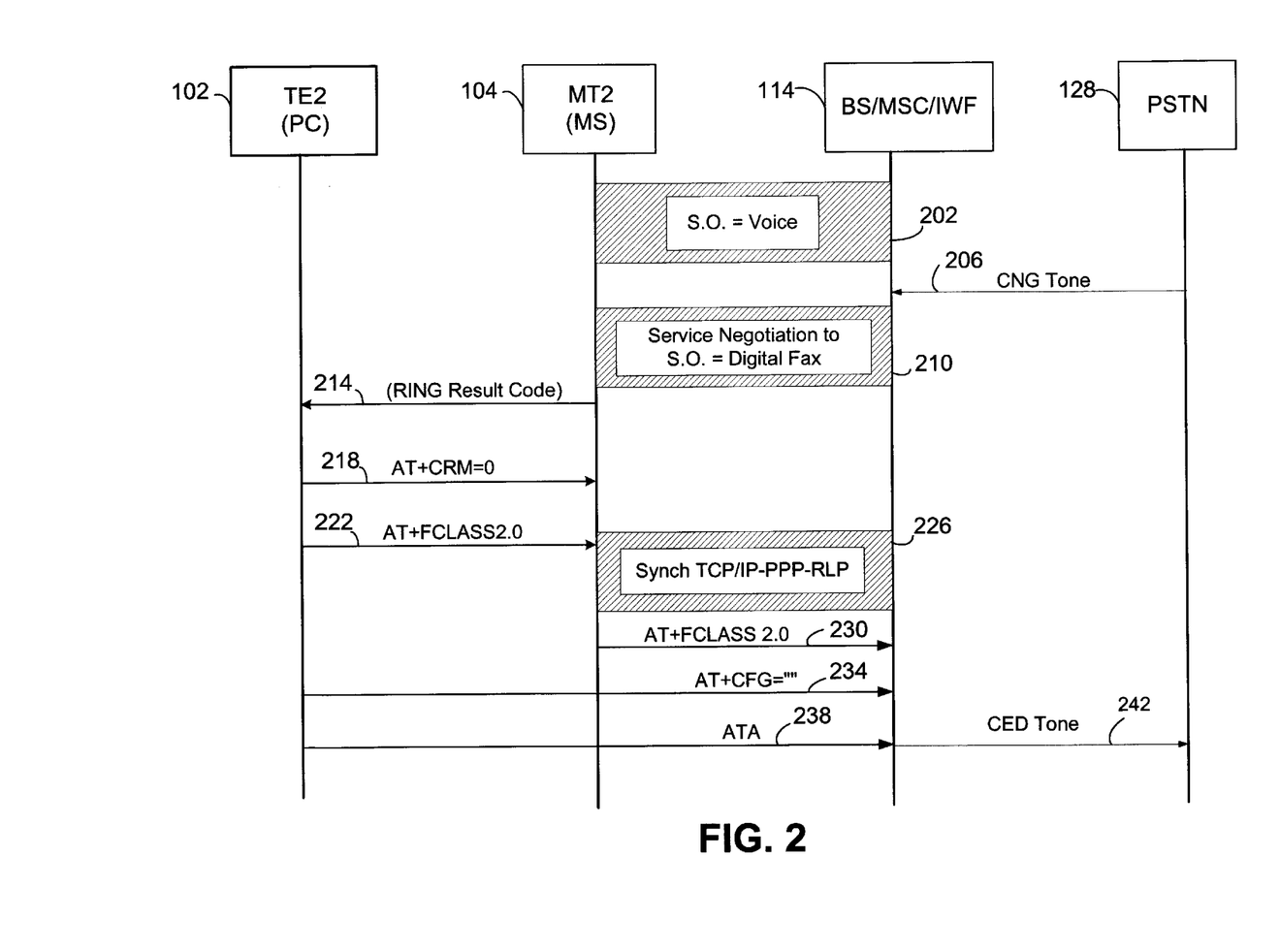
FIG. 2 is a signal sequence diagram illustrating call set up for a mobile termination fax according to a preferred embodiment of the invention.

FIG. 2 is a signal sequence diagram illustrating call set up for a mobile termination fax according to a preferred embodiment of the invention. Referring now to FIG. 2, there is shown a signal sequence diagram between 4 devices. Those devices are PC 102, MS 104, BS/MSC/IWF 114 and PSTN 128. BS/MSC/IWF 114 represents a wireless communication network infrastructure illustrated generally in FIG. 1 as BSC 112 and MSC 120. The acronym IWF reflects circuitry in new generation wireless networks and is known as Inter Working Function. For simplicity, BS/MSC/IWF 114 will be referred to herein for all purposes as BS 114.

As may be seen, communication signals representing a voice call are shown generally at 202. Communication signals 202 are transmitted between BS 114 and MS 104. Within the box 202 representing the communication signals between BS 114 and MS 104 there is an indication that the service option (S.O.) is set equal to voice. This is a shorthand indication that the call is currently supporting only voice service.

If, during the voice service call, the user of fax machine 124 initiates the transmission of a digital fax by pressing a select key (eg., a "start" button) on the fax machine, the fax machine will generate a calling tone for transmission through the PSTN. This calling (CNG) tone is transmitted through the PSTN to base station 114 as shown by signal 206. When base station 114 receives signal 206, it initiates a service negotiation to set up the digital fax transmission. A service negotiation is the procedure by which parameters of the call for a digital transmission are established in accordance with Code Division Multiple Access communication standard IS-95. Here, the parameters of the call are being changed from voice to digital fax while the call is in progress. This negotiation is referred to in block 210 as "service negotiation to S.O.=digital fax" to indicate the nature of this service negotiation. In general, base station 114 is operable to respond to any type of fax indication such as a fax calling tone for the purposes of this invention (for example, to initiate the service negotiation signals).

Once a communication link 116 between base station 114 and mobile station 104 has been modified to support digital fax, MS 104 generates a RING result code signal 214 which is transmitted PC 102. In current systems, such a signal is only transmitted from a mobile station to a PC during the initial set up of a call. Here, however, such an unsolicited RING result code signal 214 or equivalently a Ring Indicator circuit may be transmitted in the middle of the call as a result of the changes to the software logic of mobile station 104 and base station 114 which allow them to detect call in tone 206 in the middle of a call (eg., when the service option equals voice only). In general, the RING result code signal 214 is a response signal with the value of 2 as defined in EIA/TIA-602 standard. This signal is used when a mobile station is in an auto-answer mode and an incoming call is received.

Upon receiving the service negotiation signals from the base station, the mobile station sends this RING result code to alert the personal computer 102 that a call is being terminated to the mobile station. In one embodiment of the preferred invention herein, this RING result code is transmitted during an existing voice call to indicate to the personal computer that a transition from voice to digital fax is occurring and to be prepared to receive a digital fax. If and when the personal computer is prepared to receive a facsimile, it is required to issue the standard AT commands (AT+CRM=0, followed by AT+FCLASS2.0) to the mobile station as shown by signals 218 and 222, respectively. The AT+CRM=0 signal is a cellular extension to the standard AT command set. This command sets the $R_m$ interface protocol for "asynchronous data or fax." The AT+FCLASS2.0 signal is an AT command which sets the service-class parameter to CLASS2.0 fax service as specified in standard EIA/TIA-592. Concurrently with or after receiving signals 218 and 222, mobile station 104 and base station 114 takes steps to initialize the fax call as shown generally in signal 226. As may be seen, the block diagram shown as signal 226 includes a caption SYNCH TCP/IP-PPP-RLP. The signals in this block represent initialization signals for setting up a digital fax call as specified in standard IS-707. More specifically, the radio link protocol (RLP) is first established on the traffic channel after which the Point-to-Point Protocol (PPP) and the internet Protocol (IP) layers are initialized between the mobile station and the base station 114 (or IWF). A data channel for bearer traffic (digital fax signals) is established after this initialization.

Thereafter, the mobile station 104 transmits an AT+FCLASS2.0 signal 230 to base station 114. Thereafter, PC 102 transmits an AT+CFG="" signal 234 through mobile station 104 to base station 114. The 'AT+CFG=""' signal is an AT command which includes a configuration string stored by the mobile station which is to be sent to the base station prior to dialing to define a configuration. The specific command AT+CFG="" sets the configuration string to a null string. By setting this command set to a null string, no configuration is sent. Thereafter, personal computer 102 transmits to base station 114 an ATA signal 238 through mobile station 104. ATA signal 238 is an AT command which instructs the base station to answer the incoming call from the PSTN 128. Accordingly, base station 114 generates a CED tone, shown here as start CED tone signal 242. This is an analog tone which is generally transmitted by the called party during a fax call over the PSTN as specified in ITU Recommendation T.30.

At this point, call set up is complete for the mobile termination of a fax call which was initiated as a voice call and then was changed to include the communication of digital fax signals. It should be observed, that the CNG tone signal 206 was originated in the PSTN 128 and was received and identified by base station 114 in the signal sequence diagram of FIG. 2.

Figure 3:
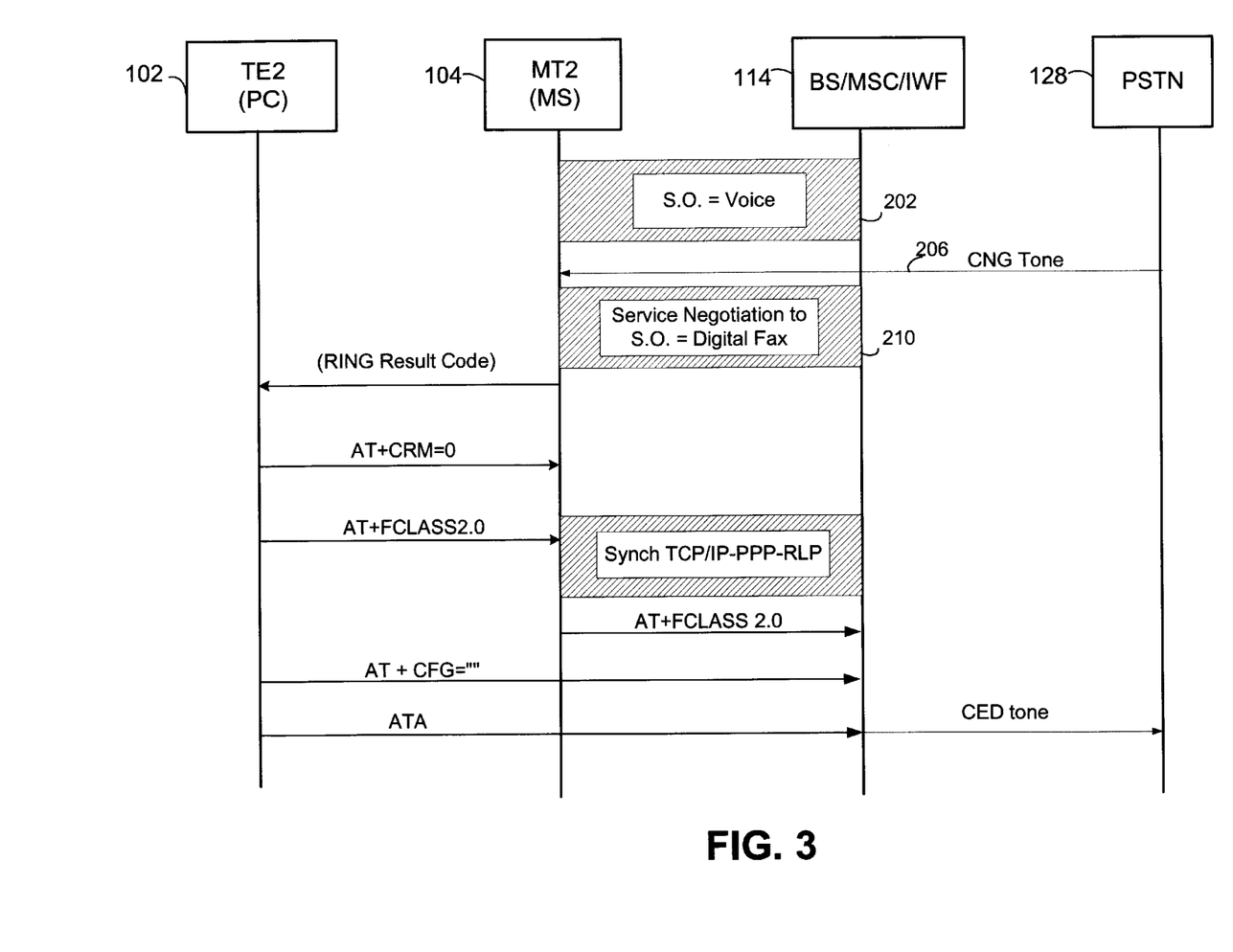
FIG. 3 is a signal sequence diagram for a call set up for a mobile termination fax call which was initiated as voice and negotiated to digital fax according to a second preferred embodiment of the invention.

FIG. 3 is a signal sequence diagram for a call set up for a mobile termination fax call which was initiated as voice and negotiated to digital fax according to a second preferred embodiment of the invention. Referring now to FIG. 3, the signal sequence flows are the same as shown in FIG. 2 with one exception. Here, in FIG. 3, the CNG tone signal 206 is not recognized by base station 114 even though base station 114 passes the signal through to mobile station 104. Rather, it is received and recognized by mobile station 104. One inference from this signal sequence diagram is that both mobile station 104 and base station 114 are coupled to receive CNG tone signal 206. In actuality, base station 114 receives CNG tone signal 206 from PSTN 128 and passes the signal through to mobile station 104. In both the embodiments of FIG. 2 and FIG. 3, base station 114 passes the CNG tone signal 206 through to mobile station 104. In other embodiments, however, the base station does not pass through the CNG tone signal to the mobile station. The difference in the signal sequence flow diagrams of FIGS. 2 and 3, however, is that the signal sequence flow diagram of FIG. 2 indicates that base station 114 recognized the start CNG signal 206. In the signal sequence flow diagram of FIG. 3, however, base station 114 did not recognize the CNG tone signal 206. Accordingly, in FIG. 3, the service negotiation to S.O.=digital fax signals of block 210 are originated by mobile station 104. In the signal sequence flow diagram of FIG. 2, they were initiated by base station 114. One reason for designing a mobile station 104 to include logic circuitry to recognize the CNG tone signal 206 is that a mobile station with this capability may roam into a service area of a base station which has not been updated and which does not have the capability of recognizing the CNG tone.

Figure 4:
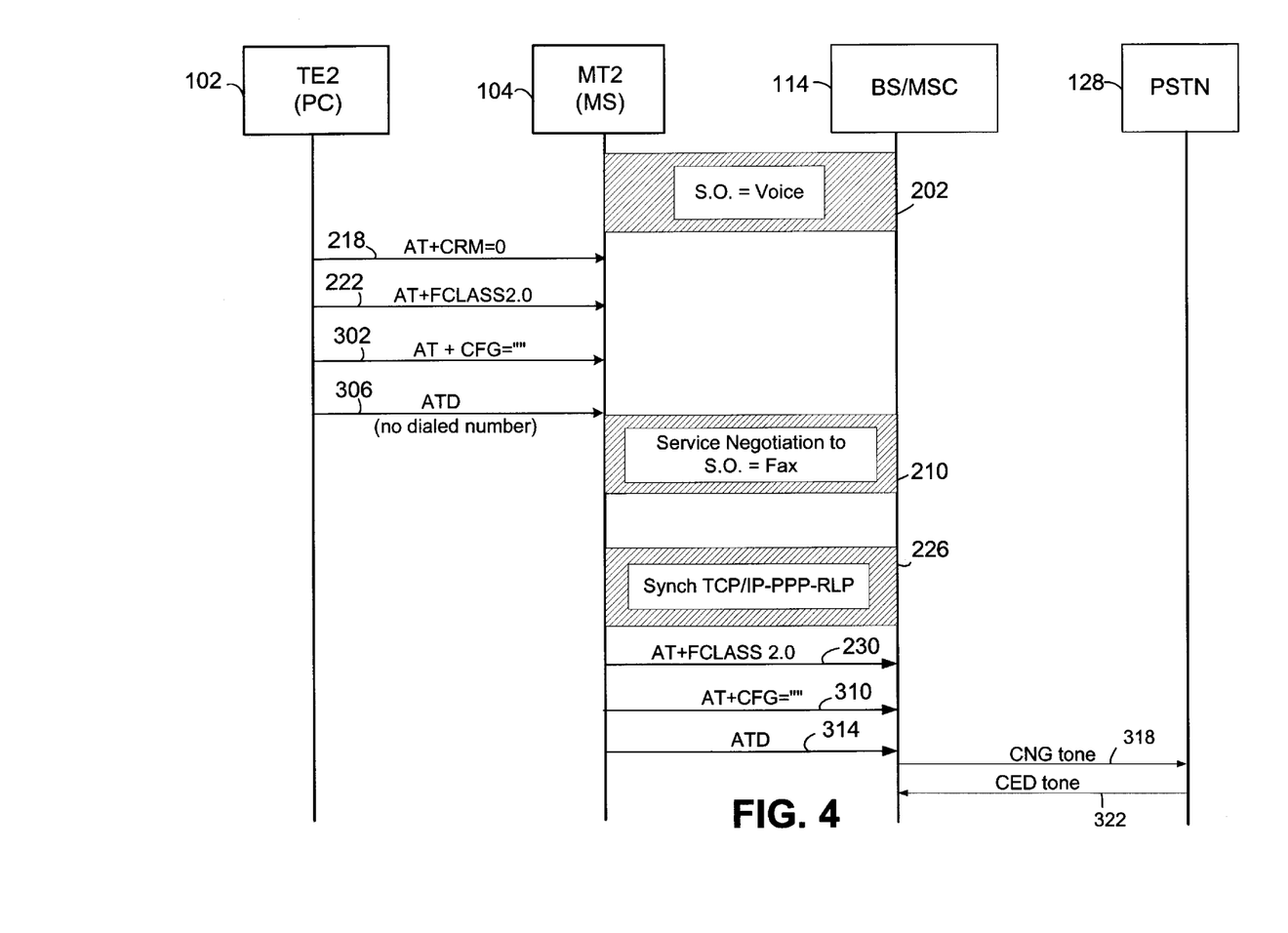
FIG. 4 is a signal sequence diagram for the call set for a mobile originated fax call which was initiated as voice and then negotiated to digital fax according to a third preferred embodiment of the invention.

FIG. 4 is a signal sequence diagram for the call set for a mobile originated fax call which was initiated as voice and then negotiated to digital fax according a preferred embodiment of the invention. Referring now to FIG. 4, there shown in signal 202 that a service option equal voice had been initially established and that a voice call is taken place between mobile station 104 and base station 114. While this voice call is taking place, a digital fax transmission sequence is initiated by PC 102. Responsive thereto, PC 102 transmits an AT+CRM=0 signal 218 to mobile station 104. This signal 218 is similar to signal 218 of FIG. 2. One difference between the timing of this signal in FIG. 4 and that of FIG. 2, however, is that this signal is issued by PC 102 after a select button has been depressed on a keyboard of PC 102 (or an "auto-answer" feature has been set on a digital fax device) to initiate a digital fax transmission. In contrast, and as shown in the signal sequence flow diagram of FIG. 2, this signal 218 was generated there after a RING result code signal was received from mobile station 104 (or, more generically, a Ring indicator circuit was energized).

After signal 218 is transmitted by PC 102 over a serial digital line to mobile station 104, PC 102 transmits an AT+FCLASS2.0 signal 222 to set the service class selection parameter to CLASS2.0 fax service. Thereafter, PC 102 transmits an AT+CFG="" signal 302 to mobile station 104 over a serial digital line. Similar to before, and in relation to signal 234 of FIG. 2, this signal 302 is generated to set the configuration string to null values so that, effectively, no configuration is transmitted. It is noteworthy that this signal 302 is transmitted from the PC 102 to mobile station 104 prior to the service negotiation signals 210 being transmitted between mobile station 104 and base station 114. In the signal sequence diagram of FIG. 2, the AT+CFG="" signal 234 is transmitted by PC 102 through MS 104 to base station 114 after the SYNCH TCP/IP-PPP-RLP signals 226 were transmitted between mobile station 104 and base station 114.

After signal 302 is transmitted from the PC 102 to mobile station 104, an ATD (or equivalently AT+CSO=n) signal 306 without a specified dialed number is transmitted from PC 102 to MS 104. This ATD signal 306 is the AT dial command. Normally, the AT dial command is followed by a dial string to tell the mobile station to initiate a digital fax call and to dial the specified number for the called party. Herein, however, the AT command is used without a dial string so as to signal the mobile station to convert the existing call into a digital call so that a facsimile may be sent to the destination of the current call. Since the call is already in progress, and the invention herein allows the connection to be maintained during the switchover, there is no need to indicate a dial string.

As one purpose of the ATD command without a dial string is for the digital fax device to ask the mobile station to initiate the service negotiation to fax, other signals can be used to accomplish the same result. For example, the digital fax device may also transmit an AT+CSO=n signal (where "n" is the service option number of digital fax) to ask the mobile station to initiate the service negotiation to fax.

Concurrently to or after receiving ATD signal 306, mobile station 104 initiates a service negotiation to set "S.O.=fax" in signal 210 which is transceived with base station 114. These negotiation signals within signal 210 are as described in relation to FIG. 2. Thereafter, as with FIG. 2, the SYNCH TCP/IP/PPP/RLP signals 226 are transmitted between mobile station 104 and base station 114. Thereafter, the AT+FCLASS2.0 signal 230 is transmitted from mobile station 104 to base station 114, as described in relation to the signal sequence flow diagram of FIG. 2. As indicated before, this AT command sets the service-class selection parameter to CLASS2.0 fax service. Thereafter, mobile station 104 generates and transmits the AT+CFG="" signal 310 and transmits it to base station 114. One difference between the signals sequence flow diagram of FIG. 4 and FIG. 2 is that this signal 310 is generated by mobile station 104. Then, ATD signal 314 (without a dialed number string) is transmitted by mobile station 104 to base station 114. As discussed in relation to 306, the transmission of this signal without a dialed number string serves to inform base station 114 that a digital fax service is being established to the destination party connected through PSTN 128.

After receiving ATD signal 314, base station 114 generates and transmits a CNG tone signal 318 to PSTN128. The CNG tone 318 is, as described before, an analog tone transmitted by the calling party during a fax call over the PSTN. Thereafter, the PSTN 322 generates and transmits to base station 114 the start CED tone signal 322 to inform the base station 114 (and ultimately the PC 102) that the recipient party connected to the PSTN 128 is ready to receive the digital fax. At this point, the call set up for converting the voice call to a digital fax call is complete and the PC may generate the fax signals.

Figure 5:
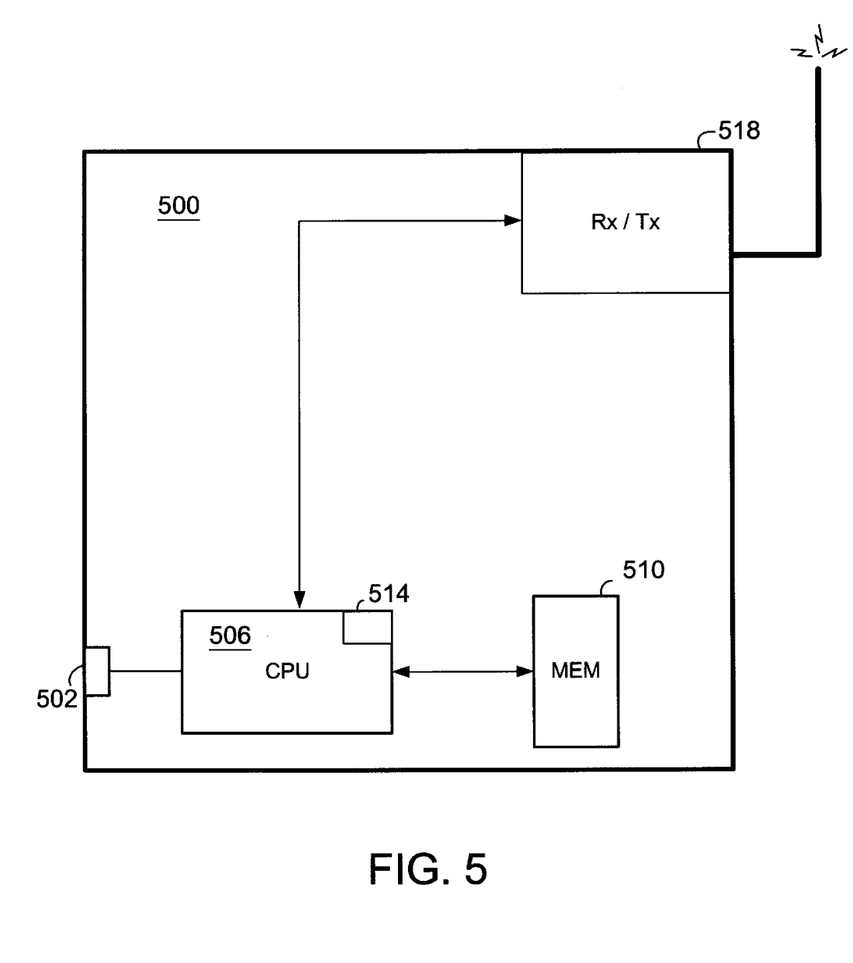
FIG. 5 is a functional block diagram of a mobile station according to preferred embodiment of the invention.

FIG. 5 is a functional block diagram of a mobile station according to preferred embodiment of the invention. Referring now to FIG. 5, mobile station 500 includes a serial digital port 502 for communicating with a device capable of generating digital facsimiles, by way of example, a computer or a digital fax device. Accordingly, CPU 506 is connected to transmit and receive communication signals from port 502. CPU 506 also is connected to memory 510. CPU 506 communicates with memory 510 to store and to receive specific commands or data or addresses for carrying out its communications. Logic circuit 514 is shown to be a part of CPU 506 in the system of FIG. 5. It could also be a separate circuit which is connected to CPU 506 in an alternate embodiment. Logic circuit 514 is for controlling signal sequences to achieve the conversion of voice call to a digital fax call. Finally, CPU 506 is connected to transceiver 518 through which wireless communication signals are transmitted and received over a wireless interface.

In operation, logic circuitry 514 includes logic to initiate service negotiation for service option of digital fax even though the present service option is voice. More specifically, logic circuit 514 is adapted to initiate the service negotiations for the service option of digital fax whenever it receives a CNG tone signal 206 from a base station 114 (of FIG. 2) which in turn is received from a PSTN 128 (of FIG. 2). Additionally, logic circuit 514 is adapted to initiate the service negotiation for a service option of digital fax whenever it receives an ATD command without a dial string from an external PC connected to port 502. Moreover, logic circuit 514 is adapted to initiate the service negotiations upon the conditions described about even when the service option is voice and a voice call is presently in place.

Figure 6:
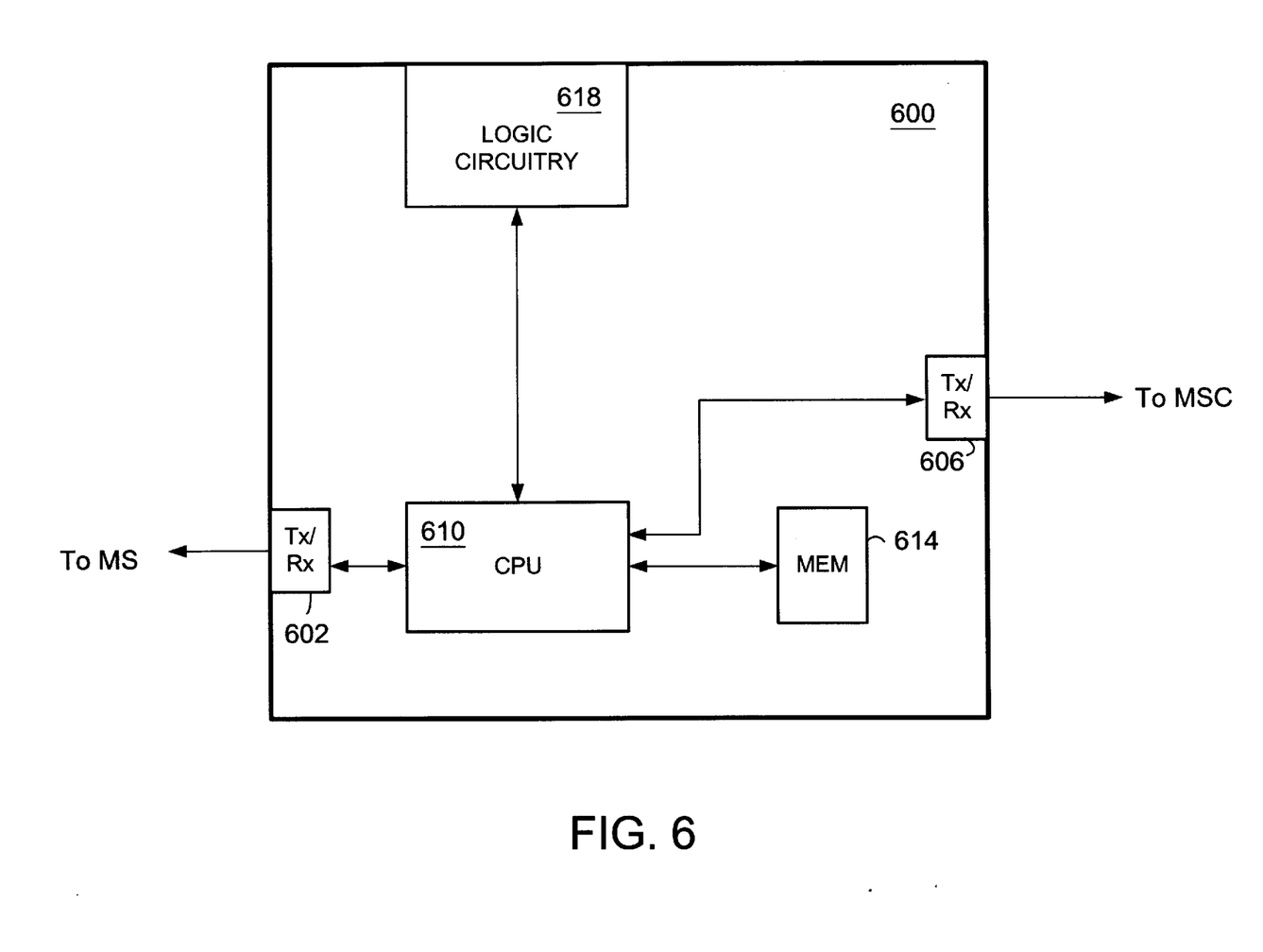
FIG. 6 is a block diagram of a base station according to a preferred embodiment of the invention.

FIG. 6 is a block diagram of a base station according to a preferred embodiment of the invention. Referring now to FIG. 6, the base station 600 includes a first transceiver 602 and second transceiver 606 both of which are connected to a CPU 610. The first transceiver 602 is for allowing the base station to communicate over a wireless medium with a mobile station while transceiver 606 is for allowing the base station to communicate with an MSC over a communication line such as T1 data line. CPU 610 also is connected to memory 614 and to logic circuit 618. Logic circuit 618, while specifically shown to be separate from CPU 610, can just as easily be formed within CPU 610. Logic circuit 618 is for recognizing that an external PSTN is transmitting a CNG tone signal 206 (of FIG. 2) to the wireless network and to respond by initiating the process to convert a voice call to a digital fax call. Accordingly, when CPU 610 receives through transciever 606 a CNG tone 206 which was transmitted by an external MSC (and originated by the PSTN), the base station 600 initiates the "service negotiation to S.O.=digital fax" signals 210 as described in the description for FIG. 2.

In reference to the mobile station in FIG. 5 and the base station of FIG. 6, it is understood that the corresponding methods described in association with FIGS. 2, 3 and 4 are performed by these devices as described herein. Moreover, while some of the commands illustrated herein this disclosure may relate to specific type of technology, such as code division multiple access (CDMA) wireless communication technology, the invention may be applied with equal force to other technologies such as time division multiple access (TDMA) and global system mobile (GSM) wireless technology.

As may be seen, the present invention allows a user to convert an ongoing voice call to a digital fax call for the transmission of digital fax information. The invention, therefore, not only reduces actual expenses for the inefficiencies result from a user previously having had to disconnect the voice in order to initiate the digital fax. Additionaly, the increased efficiencies reduced user time which, when accumulated, can result in significant labor savings. The present invention is believed to be especially effective when configured and employed as described herein. Those skilled in the art, however, will readily recognize that numerous variations and substitutions may be made in the invention and its use and configuration to achieve substantially the same results as achieved by the embodiments and, in particular, the preferred embodiments described herein. Each variation is intended to be included in the description herein and forms a part of the present invention. The foregoing detailed description is, thus, to be clearly understood as being given by way of illustration and example only, the spirit and scope of the present invention being limited solely by the appended claims.

What is claimed is:

1. A code division multiple access (CDMA) communication network base station that is coupled to receive calls from a landline telephone network, comprising:

a first transceiver for communicating with an external device;

a second transceiver for transmitting and receiving wireless communication signals; and circuitry adapted to cause the base station to interpret any of a set of received signals to convert a voice call to a digital fax call whenever a fax device connected to one of the landline telephone network and a mobile station generates a part of the set of received signals, the set of received signals including:
 a service option (SO) specifying voice;
 a calling tone (CG) received by way of the landline telephone network; and
 a service option (SO) specifying digital fax;

said circuitry also being adapted to generate and transmit a set of signals to both the mobile station and the base station according to which one is receiving a fax from a digital fax, said set of signals for transmission including:
 radio link protocol signals for transmission to an external fax coupled to the landline telephone network;
 point-to-point protocol signals;
 internet protocol signals;
 an AT+FCLASS2.0 signal to set CLASS2.0 fax service;
 an AT+CFG=( ) signal to set the configuration to a null string; and
 an ATA signal to instruct the mobile station to receive the incoming call from the landline telephone network.

2. A method in a mobile station, comprising the steps of:

setting up a voice only call in an IS-95 compatible mobile station;

setting a service negotiation signal (SO) equal to voice;

receiving from a base station over a wireless link, after a voice call is setup, one of an SO signal set equal to digital fax or a CNG tone passed through the base station, the CNG tone having been transmitted by a digital fax device coupled to the base station by way of a landline telephone network;

setting up a digital fax call;

receiving digital fax signals from the base station over the wireless link;

receiving an AT+CFG="" signal from a digital fax device and transmitting the AT+CFG="" signal to the base station wherein the AT+CFB="" signal is a configuration signal with a null string;

receiving and interpreting an AT+FCLASS2.0 signal from the digital fax device;

receiving and interpreting an AT+CRM=0 signal from the digital fax device;

transmitting, to the digital fax device, a RING result code signal; and transmitting over a digital communication line to a digital fax device, the received digital fax signal, in a digital fax protocol.

3. A mobile station, comprising;

a first transeiver for communicating with an external device over a serial digital line;

a second transceiver for transmitting and receiving wireless communication signals; and a CPU connected to the first and second transceivers, which CPU includes logic circuitry adapted to cause the mobile station to generate signals to convert a voice call to a digital fax call whenever the mobile station receives one of four different signals during a voice call from one of and externally connected fax or a base station, the four signals including:

a service option from a base station set equal to digital fax;

a CNG tone from the base station;

a tone from the digital fax indicating depression of a "start" key; and an AT+CSO=n signal is received from the digital fax.

* * * * *